United States Patent [19]
Killian

[11] Patent Number: 6,155,397
[45] Date of Patent: Dec. 5, 2000

[54] CLUTCH DRIVEN DISC FRICTION MATERIAL MOUNTING

[75] Inventor: Michael L. Killian, Troy, Mich.

[73] Assignee: Eaton Corporation, Cleveland, Ohio

[21] Appl. No.: 09/393,042

[22] Filed: Sep. 9, 1999

[51] Int. Cl.$^7$ .................................................. F16D 69/04
[52] U.S. Cl. ................................ 192/107 M; 192/107 R; 219/91.2
[58] Field of Search ...................... 192/107 R, 107 M; 219/91.2; 188/218 XL, 250 G

[56] References Cited

U.S. PATENT DOCUMENTS

| | | |
|---|---|---|
| 1,085,769 | 2/1914 | Thomson ................................ 219/91.2 |
| 1,846,560 | 2/1932 | Kattwinkel ........................... 192/107 R |
| 3,037,860 | 6/1962 | Masterson et al. . |
| 3,913,716 | 10/1975 | Sedlock ................................ 192/107 R |
| 3,946,192 | 3/1976 | Allen et al. . |
| 4,565,274 | 1/1986 | Cameron . |
| 4,860,872 | 8/1989 | Flotow . |
| 4,869,356 | 9/1989 | Cameron ............................. 192/107 M |
| 5,158,165 | 10/1992 | Flotow . |
| 5,322,151 | 6/1994 | Denton et al. . |

*Primary Examiner*—Rodney H. Bonck
*Attorney, Agent, or Firm*—Dykema Gossett PLLC

[57] ABSTRACT

A clutch driven disc assembly includes a hub and an annular spring plate fixed to the hub. A friction disc assembly is mounted concentric with an axis of rotation of the hub and is rotatably relative to the spring plate. A plurality of drive springs are operably disposed between the spring plate and the friction disc assembly. The friction disc assembly further includes a reinforcing plate and a substantially annular disc fixed to the reinforcing plate. A friction material button is fixed to the substantially annular disc. Friction material button has a metallic friction material cookie with at least three apertures. A backer plate is fixed to the friction material. The backer plate covers the apertures in the friction material cookie. At least three spot welds are within three corresponding apertures in the cookie. At least one of the welds are offset from a line joining two others of the welds. The welds join the substantially annular disc and the backer plate, in turn fixing the friction material button to the substantially annular disc.

10 Claims, 3 Drawing Sheets

FIG 3
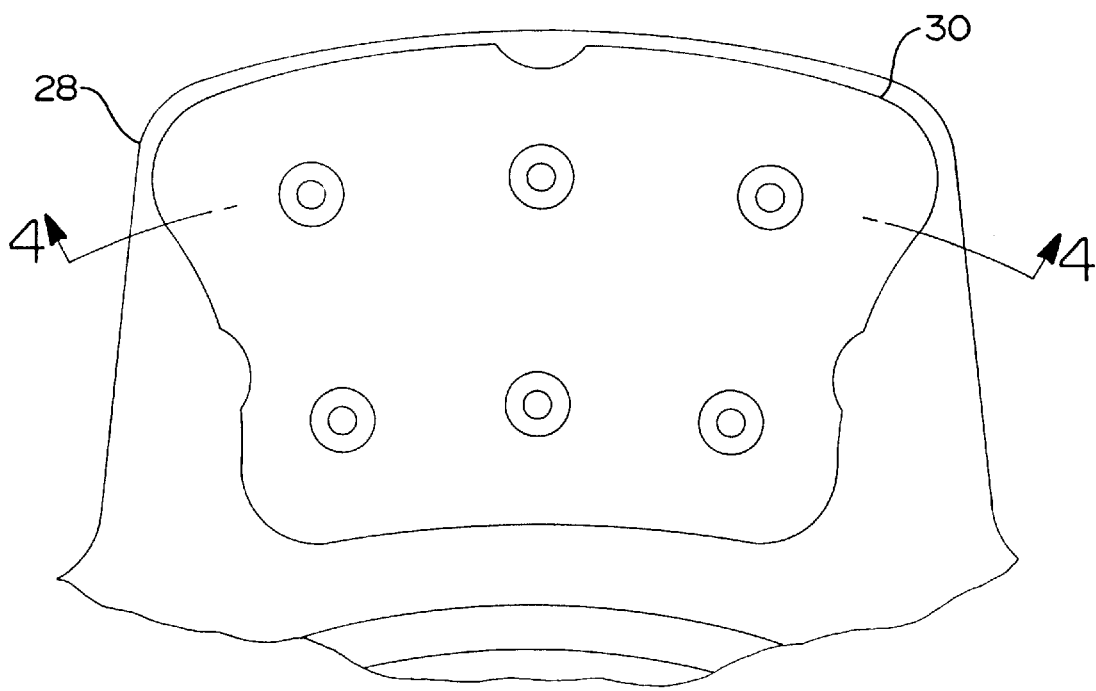
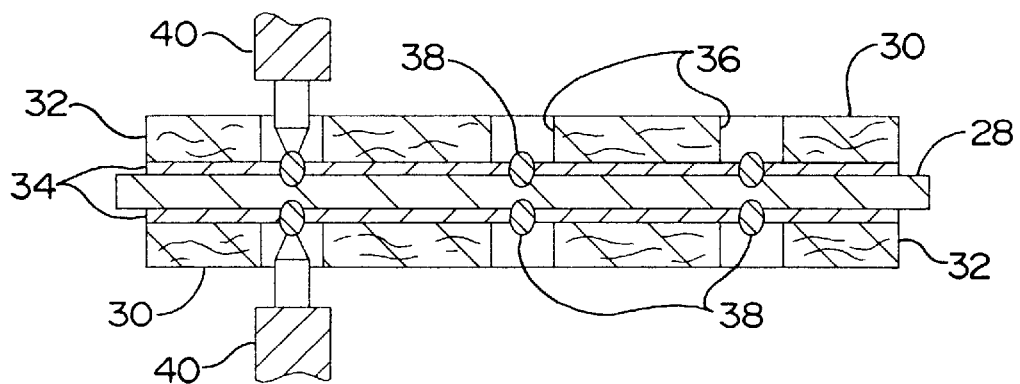
FIG 4

CLUTCH DRIVEN DISC FRICTION MATERIAL MOUNTING

FIELD OF THE INVENTION

This invention relates in general to friction clutches and in particular to the structure of clutch driven discs.

BACKGROUND OF THE INVENTION

Clutches are well known devices used to selectively connect a source of rotational power, such as the crankshaft of an internal combustion engine and its flywheel, to a driven mechanism, such as a transmission. Typically, clutches have a driven disc rotatably fixed to the transmission input shaft and axially disposed between a flywheel and a pressure plate. Both the flywheel and the pressure plate are rotatably fixed to the output shaft of the engine. The pressure plate is axially biased toward the flywheel by an axial spring load. When the clutch is in an engaged condition, the pressure plate clamps the driven disc against the flywheel. Friction material is disposed on both sides of the driven disc to resist slipping between the driven disc and both the pressure plate and the flywheel. When the clutch is in a released condition, the axial spring load is overcome by a release mechanism, unclamping the driven disc. With the driven disc unclamped, relative rotation between the transmission input shaft and the engine output shaft becomes possible. When the clutch is reengaged, the pressure plate is pressed against the friction material, halting relative rotation between the engine output shaft and the transmission input shaft.

When the clutch is reengaged, and to a lesser degree when the clutch is released, the friction material wears due to the contact at relative speed with the pressure plate and flywheel.

Commonly, the friction material on the driven disc is provided in the form of a plurality of discrete elements or cookies. The cookies are adhesively bonded or brazed to metal plates to form friction material buttons. The buttons are in turn fixed to radially extending paddles of the driven disc assembly by rivets. The thickness of the rivet heads limits the amount of the friction material available for wear which can be usefully employed to provide engagement between the engine and the transmission. To compensate for the rivet head thickness, the friction material is made thicker than would otherwise be necessary. Also, the backer plate and the disc paddles are both larger than the cookies to enable the buttons to be riveted to the paddles at their outer edges.

Disadvantages of riveting the buttons to the paddles include: the need to provide the necessary extra thickness of friction material for clearing the rivet heads and the associated increased rotational inertia contributed by the friction material; the extra rotational inertia attributable to the extra backer plate material and extra disc material used at the rivet locations; and a susceptibility to warpage of the cookie, characterized by the center or edges of the friction material lifting off of the backer plate with usage of the clutch and wear of the driven disc.

It is desired to provide a driven disc with a reduced height attachment for friction material buttons which alternatively enables the use of thinner friction material cookies or extended wear of the friction material. It is also desired to provide a driven disc assembly having lower inertia. It is also desired to provide a driven disc having the buttons mounted thereto in such a manner that the tendency of the cookies to distort relative to the driven disc is reduced.

It is also desired to provide a method of making a driven disc having a reduced height attachment for friction material buttons which enables the use of thinner friction material cookies, or, alternatively, enables the extended wear of the friction material. It is also desired to provide a method of making a driven disc having lower inertia. It is also desired to provide a driven disc having buttons mounted thereto in such a manner that any tendency of the cookies to distort relative to the driven disc is reduced.

SUMMARY OF THE INVENTION

A clutch driven disc assembly includes a hub and an annular spring plate fixed to the hub. A friction disc assembly is mounted concentric with an axis of rotation of the hub and is rotatably relative to the spring plate. A plurality of drive springs are operably disposed between the spring plate and the friction disc assembly. The friction disc assembly further includes a reinforcing plate and a substantially annular disc fixed to the reinforcing plate. A friction material button is fixed to the substantially annular disc. Friction material button has a metallic friction material cookie with at least three apertures. A backer plate is fixed to the friction material. The backer plate covers the apertures in the friction material cookie. At least three spot welds are within three corresponding apertures in the cookie. At least one of the welds are offset from a line joining two others of the welds. The welds join the substantially annular disc and the backer plate, in turn fixing the friction material button to the substantially annular disc.

A method for fabricating a clutch driven disc including the steps of forming a hub, and rotatably fixing an annular spring plate to the hub concentric thereto. A friction disc assembly is mounted concentric with the hub for rotation relative to the spring plate. A plurality of drive springs are installed between the spring plate and the disc assembly. The friction disc assembly is formed by forming a reinforcing plate having spring pocket configured to receive the drive springs, by forming a substantially annular disc extending radially beyond the reinforcing plate, and fixing the substantially annular disc to the reinforcing plate. A cookie is formed out of metallic friction material so as to have at least three apertures therethrough. The apertures in the cookie are oriented so that at least one of the apertures is offset from a line joining two others of the apertures. A backer plate of is formed of steel. The friction cookie is brazed to the backer plate to form a friction material button. The backer plate is positioned to cover apertures. The backer plate is welded to the annular disc by forming spot welds aligned with the apertures in the cookies.

A method of fixing a friction material cookie to a driven disc paddle including the steps of forming a disc having a radially extending paddle and forming a friction material cookie of sintered metal having at least three apertures therethrough. The apertures are oriented in the cookie so that at least one of the apertures is offset from a line joining two others of the apertures. A backer plate is formed of steel. The friction cookie is brazed to the backer plate to form a friction material button. The backer plate covers the apertures in the friction material cookie. The friction material button is spot welded to the annular disc by forming spot welds aligned with the apertures in the cookies.

The invention provides a clutch driven disc with a reduced height attachment for friction material buttons which alternatively enables the use of thinner friction material cookies or extended wear of the friction material. The invention also provides a driven disc assembly having lower inertia than a clutch driven disc employing rivets to join friction material buttons to the driven disc. The invention also provides a driven disc having the buttons mounted thereto in such a manner that the tendency of the cookies to distort relative to the driven disc is reduced.

The invention additionally provides a method of making a driven disc having a reduced height attachment for friction material buttons enabling the use of thinner friction material cookies, or, alternatively, enabling the extended wear of the friction material. The invention provides a method of making a driven disc having lower inertia. The invention also provides a driven disc having buttons mounted thereto in such a manner that any tendency of the cookies to distort relative to the driven disc is reduced relative to distortion which would be anticipated for cookies fixed to a clutch driven disc by rivets passing through latterly extending flanges of the backer plates.

BRIEF DESCRIPTION OF THE DRAWINGS

FIG. 3 is an enlarged view of a portion of the clutch driven disc of FIG. 1 in the circle 3.

FIG. 4 is a sectional view of the portion of the clutch driven disc of FIG. 3 in the direction of arrows 4.

DESCRIPTION OF PREFERRED EMBODIMENTS

Figure 1:
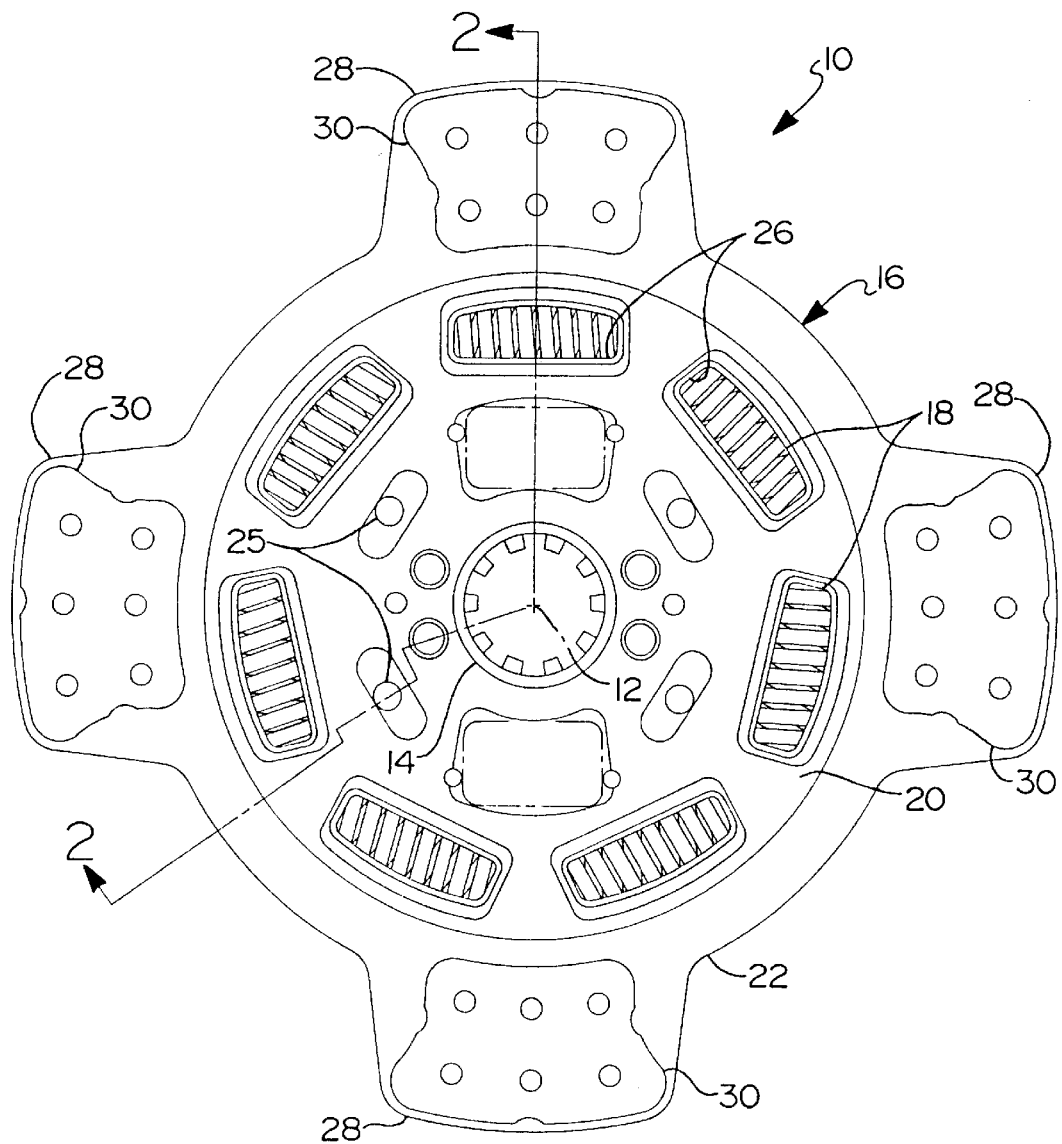
FIG. 1 is an end view of a clutch driven disc.
Figure 2:
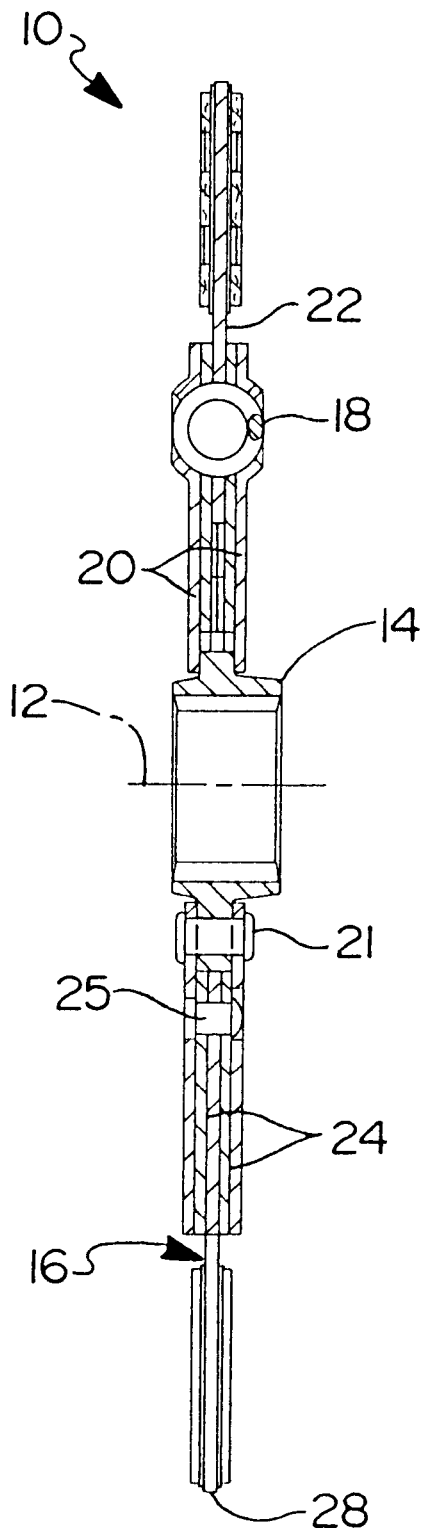
FIG. 2 is a sectional side view of the clutch driven disc of FIG. 1 in the direction of arrows 2.

A clutch driven disc assembly 10 as shown in FIG. 1 and FIG. 2 includes an axis of rotation 12, a hub 14, a friction disc assembly 16 and a plurality of damping or drive springs 18 disposed between hub 14 and friction disc assembly 16.

A pair of spring plates 20 are fixed to hub 14 by rivets 21.

Friction disc assembly 16, best shown in FIG. 2, includes a substantially annular disc 22 fixed to a pair of annular reinforcing plates 24 by rivets 25 or other fastening means. Disc 22 is typically a plain carbon steel such as SAE 1080. Reinforcing plates 24 are axially disposed between spring plates 20. Drive springs 18 are disposed simultaneously in spring pockets 26 in reinforcing plates 24 and spring pockets in spring plates 20. Relative rotation of disc assembly 16 to hub 14 compresses drive springs 18.

Disc 22 has a plurality of radially extending paddles 28, best shown in FIG. 3. While four paddles 28 are shown, an alternative number of paddles 28 such as three may be employed. Friction elements or buttons 30 made of friction material are disposed on both sides of each paddle 28. Friction buttons 30 are used to provide frictional engagement with a clutch flywheel (not shown) and a clutch pressure plate (not shown) when installed in a vehicle.

Clutch friction buttons 30 include a friction material cookie 32 made of an appropriate sintered metallic composite. Such friction materials are well known in the art. Cookie 32 is fixed to a steel backer plate 34, preferably by brazing. However, unlike the extended backer plate used for the riveted design, backer plate 34, as configured for attachment to paddle 28 in accord with the present invention, is substantially the same size and shape as friction material cookie 32. The resultant smaller size of backer plate 34 is enabled by the eliminating the need for laterally extending rivet flanges. Backer plate 34 is formed of steel. Backer plate 34 is in turn welded to paddle 28. Cookies 32 have a plurality of apertures 36 therethrough. Apertures 36 are sized to accommodate a welding torch or welding electrode 40 to enable the welding of backer plate 34 to paddle 28. In a preferred embodiment, backer plate 34 is unperforated, having no holes, or at least no holes in alignment with apertures 36. A plurality of welds 38, each aligned with one of apertures 36, connects backer plate 34 to paddle 28. While a preferred embodiment employs six apertures 36 to accommodate six welds 38, alternative embodiments may employ more or fewer welds 38. The number and placement of welds 38 is determined by the optimal number and location of welds 38 needed to prevent distortion of cookies 32 relative to backer plates 34 and paddles 28. At least three welds 38 should be employed to attach each cookie. At least one weld should be offset from a straight line passing between two other welds 38 on the same paddle to provide the desired anti-warping effect.

A method for fabricating clutch assembly 10 is now described. Hub 14 is formed by conventional means, including stamping, forging, casting or other appropriate metal forming processes. Annular spring plates 20 are formed by an appropriate metal forming process such as stamping and are rotatably fixed to hub 14. Reinforcing plates 24 are stamped of steel and have spring pockets 26 formed therein configured to receive springs 18. Annular disc 22 is stamped of steel. Friction disc assembly 16 is assembled by riveting reinforcing plates 24 to annular disc 22. Friction disc assembly 1 6 is located concentric with spring plates 20 and hub 14 for rotation relative to spring plates 20 and hub 14. A plurality of drive springs 18 are installed between spring plates 20 and friction disc assembly 16.

A method for welding friction buttons 30 to disc 22 is now disclosed. The inside Resistance Spot Welding (RSW) method resistance welds the low carbon steel backer plate 34 to steel disc 22. The top or outermost surface of the resistance spot welds are recessed below the top surface of the friction material. It is preferred to keep braze material out of the holes. However, some braze material contamination resulting from a small amount of braze overflow into apertures 36 when friction material cookie 32 is brazed to backer plate 34 will not seriously degrade weld quality of weld 38.

Because disc 22 is a plain, high carbon steel like SAE 1080, heating the weld area of the disc is recommended. Such heating can be accomplished by the resistance welding machine as part of the normal resistance welding cycle, without additional equipment. Immediate post weld heating also could be implemented with the resistance welding machine.

RSW enables the simultaneous welding of all welds 38 of button 30. Welds 38 are formed by a welding probe or electrode 40 making electrical contact with backer plate 34. Probe 40 is energized with electrical current. Electrical resistance at the interface between backer plate 34 and paddle 28 generates heat therebetween sufficient to fuse plate 34 and paddle 28 together. The fusing generates weld 38. With RSW, two buttons 30 could be welded on each side of disc 24 simultaneously. Forming all welds 38 of two opposing buttons 30 simultaneously is a low risk, practical alternative approach to riveting.

RSW is well suited for extremely high production volumes. A resistance spot welding system could be designed and built to deposit all welds 38 on all disc paddles 28 simultaneously. While a multiple head system may be complex, multi-head RSW systems are already in use for producing office furniture, screen doors and numerous automotive components.

Advantages of driven discs using the RSW method include lower inertia, decreased cookie 32 deformation during processing, increased clearances and lower cost. Inertia is reduced because backer plate 34 is smaller, being the same size as the friction material cookie, and because paddles 28 are smaller, and because there are no rivets holding and because friction material cookies 32 are thinner. Welds 38 do not extend significantly beyond backer plate 34, as no filler metal is added. Deformation of cookies 32 is reduced because welds 38 are located at optimal locations within the area of the cookie.

Another benefit of the present invention is a reduction in the cost of fabricating a clutch driven disc. Lower cost is obtained by the elimination of the rivets which would otherwise be needed to retain cookies 30, by a reduction in the amount of friction material needed, by a reduction in the amount of backer plate material due to the smaller size of the backer plate, and by a reduction in the amount of disc material needed due to the smaller paddle areas. Production cycle times may also be reduced as the resistance welding cycle requires only a fraction of the time needed to rivet friction material buttons in place.

The embodiments disclosed herein have been discussed with the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

I claim:

1. A clutch driven disc assembly comprising:

a hub having an axis of rotation;

an annular spring plate rotatably fixed to the hub;

a friction disc assembly mounted concentric with the axis of rotation for rotation relative to the spring plate;

a plurality of drive springs operably disposed between the spring plate and the friction disc assembly;

the friction disc assembly including:

a reinforcing plate having spring pockets receiving the drive springs;

a substantially annular disc fixed to the reinforcing plate; and a friction material button fixed to the substantially annular disc and comprising:

a metallic friction material cookie having a plurality of apertures, a backer plate fixed to the friction material and covering the apertures in the friction material cookie, and at least three spot welds within three corresponding apertures in the cookie with at least one of the welds being offset from a line joining two others of the welds and the welds joining the substantially annular disc and the backer plate which fixes the friction material button to the substantially annular disc.

2. A clutch driven disc assembly as claimed in claim 1 wherein the spot welds are resistance welds between the backer plate and the substantially annular disc.

3. A clutch driven disc assembly as claimed in claim 2 wherein the backer plate is the same size and shape as the friction material cookie.

4. A clutch driven disc assembly as claimed in claim 2 wherein the substantially annular disc has a plurality of radially extending paddle areas, and both the friction material and the backing plate are substantially the same size and shape as the paddle areas.

5. A clutch driven disc assembly as claimed in claim 2 wherein the weld is recessed within the aperture substantially below an outermost surface of the metallic friction material cookie.

6. A method for fabricating a clutch driven disc including the steps of:

forming a hub;

rotatably fixing an annular spring plate to the hub concentric thereto;

mounting a friction disc assembly concentric with the hub for rotation relative to the spring plate;

installing a plurality of drive springs between the spring plate and the disc assembly;

forming the friction disc assembly by:

forming a reinforcing plate having spring pockets configured to receive the drive springs;

forming a substantially annular disc extending radially beyond the reinforcing plate;

fixing the substantially annular disc to the reinforcing plate; and forming a cookie out of metallic friction material having at least three apertures therethrough;

orienting the apertures in the cookie so that at least one of the apertures is offset from a line joining two others of the apertures;

forming a backer plate of steel;

brazing the friction cookie to the backer plate to form a friction material button with the backer plate being positioned to cover the apertures;

spot welding the backer plate to the substantially annular disc by forming spot welds aligned with the apertures in the cookies.

7. A method of forming a clutch driven disc as claimed in claim 6 wherein the spot welds are resistance welds.

8. A method of forming a clutch driven disc as claimed in claim 7 wherein the backing plate is the same size and shape as the friction material cookie.

9. A method of forming a clutch driven disc as claimed in claim 8 wherein the substantially annular disc is provided with a plurality of radially extending paddle areas, and both the friction material and the backing plate are substantially the same size and shape as the paddle areas.

10. A method of fixing a friction material cookie to a driven disc paddle including the steps of:

forming a disc having a radially extending paddle;

forming a friction material cookie of sintered metal having at least three apertures therethrough;

orienting the apertures in the cookie so that at least one of the apertures is offset from a line joining two others of the apertures;

forming a backer plate of steel;

brazing the friction cookie to the backer plate to form a friction material button so the backer plate covers the apertures in the cookie;

spot welding the friction material button to the annular disc by forming spot welds aligned with the apertures in the cookies.

* * * * *